(12) United States Patent
Baxter et al.

(10) Patent No.: US 10,335,711 B2
(45) Date of Patent: Jul. 2, 2019

(54) SYSTEM INCLUDING A DIRECT CONTACT DESUBLIMATING HEAT EXCHANGER FOR REDUCING FOULING

(71) Applicants: Larry Baxter, Orem, UT (US); Kyler Stitt, Lindon, UT (US); Aaron Sayre, Spanish Fork, UT (US); Christopher Hoeger, Provo, UT (US)

(72) Inventors: Larry Baxter, Orem, UT (US); Kyler Stitt, Lindon, UT (US); Aaron Sayre, Spanish Fork, UT (US); Christopher Hoeger, Provo, UT (US)

(73) Assignee: Sustainable Energy Solutions, LLC, Orem, UT (US)

( * ) Notice: Subject to any disclaimer, the term of this patent is extended or adjusted under 35 U.S.C. 154(b) by 244 days.

(21) Appl. No.: 15/485,495

(22) Filed: Apr. 12, 2017

(65) Prior Publication Data

US 2018/0299176 A1    Oct. 18, 2018

(51) Int. Cl.
*B01D 7/02* (2006.01)
*B01D 1/00* (2006.01)
*B01D 53/00* (2006.01)

(52) U.S. Cl.
CPC ............ *B01D 7/02* (2013.01); *B01D 1/0094* (2013.01); *B01D 53/002* (2013.01)

(58) Field of Classification Search
CPC . B01D 1/0094; B01D 1/02; B01D 7/02; F25J 3/00; F25J 3/08; F25J 2215/80; F25J 2220/40; F25J 2220/44; F25J 2220/80
See application file for complete search history.

(56) References Cited

U.S. PATENT DOCUMENTS

| 2018/0231336 A1* | 8/2018 | Baxter | F28F 19/00 |
| 2018/0252469 A1* | 9/2018 | Baxter | B01D 53/002 |
| 2018/0266762 A1* | 9/2018 | Baxter | F25J 3/08 |
| 2018/0299200 A1* | 10/2018 | Baxter | B01D 7/00 |

* cited by examiner

*Primary Examiner* — Marc E Norman

(57) ABSTRACT

A process to prevent fouling using a desublimating heat exchanger is disclosed. An outlet stream from the desublimating heat exchanger may be split into a plurality of parallel streams. The parallel streams may be sent through other devices for performing a unit operation, and the devices for performing a unit operation may change the temperature of at least one of the parallel streams. Parallel streams of differing temperature may emerge from the devices for performing a unit operation. The parallel streams of differing temperature may be sent to a mixing chamber. A mixed stream of uniform temperature may emerge from the mixing chamber, and the mixed stream may be recycled back to the desublimating heat exchanger. The mixing chamber may be separate from the desublimating heat exchanger, or the parallel streams of differing temperature may be mixed in the desublimating heat exchanger.

12 Claims, 10 Drawing Sheets

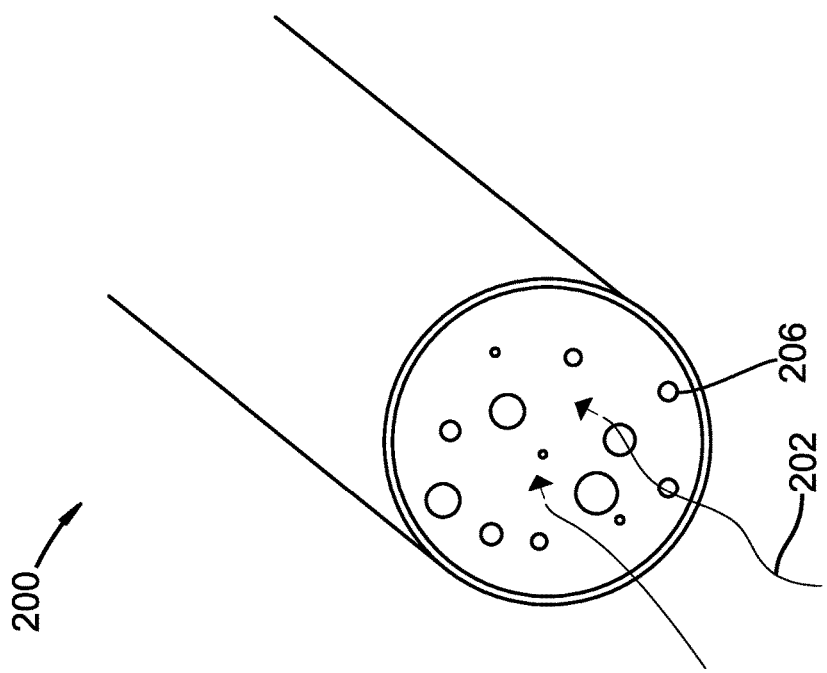
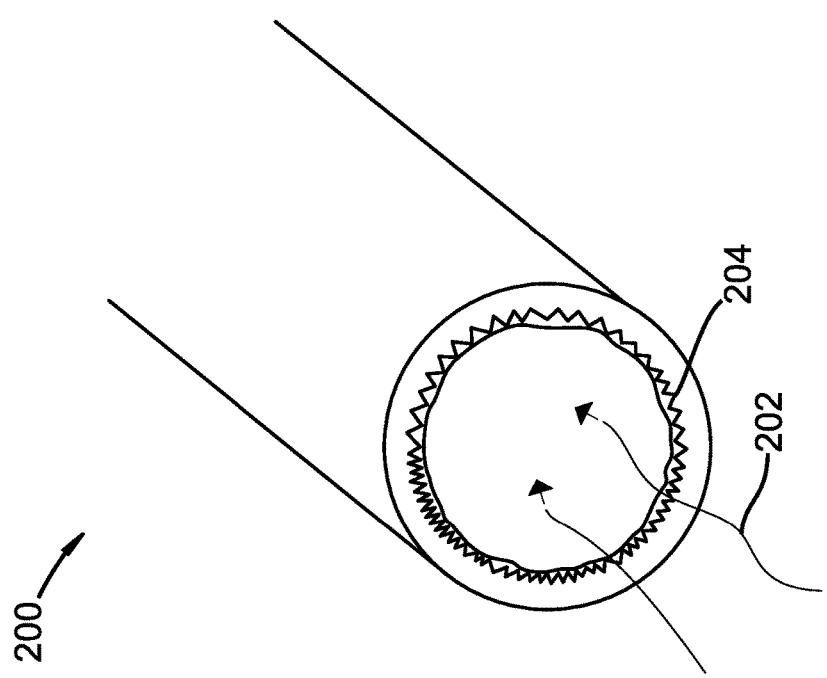
FIG. 2B
PRIOR ART
FIG. 2A
PRIOR ART

SYSTEM INCLUDING A DIRECT CONTACT DESUBLIMATING HEAT EXCHANGER FOR REDUCING FOULING

This invention was made with government support under DE-FE0028697 awarded by The Department of Energy. The government has certain rights in the invention.

BACKGROUND

Field of the Invention

The disclosed embodiments relate to methods and systems for decreasing heat-transfer inhibiting mass accumulation in an apparatus such as a direct exchange heat exchanger for desublimating the condensable vapors, such as carbon dioxide, from a process stream.

Background of the Invention

The separation of carbon dioxide from other light gases such as nitrogen is important for achieving carbon dioxide sequestration. Flue gas from a conventional power station typically includes from about 4% (vol.) to about 16% (vol.) carbon dioxide ($CO_2$). It is commonly believed that this $CO_2$ represents a significant factor in increasing the greenhouse effect and global warming.

Currently described systems and methods include separating condensable vapors (e.g., carbon dioxide) from other gases (e.g., nitrogen) in a continuous separation process. See International Patent Application PCT/US2011/061737, which is incorporated by reference. The separation process is carried out in a direct contact heat exchanger (DCHE), in which a process stream comprising condensable vapors and light gases come in direct, physical contact with a non-volatile heat exchange liquid (NVHEL). The NVHEL cools the process stream and causes the condensable vapors to desublimate, thereby forming a slurry of desublimated solids and the NVHEL. The desublimation of the condensable vapors also causes separation of the vapors from other gases in the process stream, thereby forming a separated light-gas stream.

The process of desublimation may use low temperatures so that substances such as carbon dioxide are converted from the gas state to the solid state and may result in heat-transfer inhibiting mass accumulation, such as frosting or fouling, on elements of the equipment used during known systems and methods for separating condensable vapors.

Processes may be performed, via devices for performing a unit operation, on liquids and gases, which may result in the liquids or gases having a changed temperature. In some situations, it may be desirable to mix a liquid or gas stream with other liquids or gases. Sometimes the mixing of gases or liquids of a certain temperature with a liquid or gas of a different temperature may result in freezing of equipment, fouling of equipment, excess warming of a liquid or gas stream that may result in vaporization or gas in undesired places.

Additionally, having streams of various temperatures exit or enter various equipment, such as a heat exchanger, may result in difficulties in controlling the temperature at various points in a process. Consequently, a need still exists for controlling the temperature of various equipment and processes.

BRIEF DESCRIPTION OF THE DRAWINGS

FIG. 2A is an illustration of the fouling that may occur in a process using a desublimating heat exchanger with solid freezing out of solution;

FIG. 2B is an illustration of the fouling that may occur in a process using a desublimating heat exchanger with some of the liquid vaporizing;

SUMMARY

Figure 1:
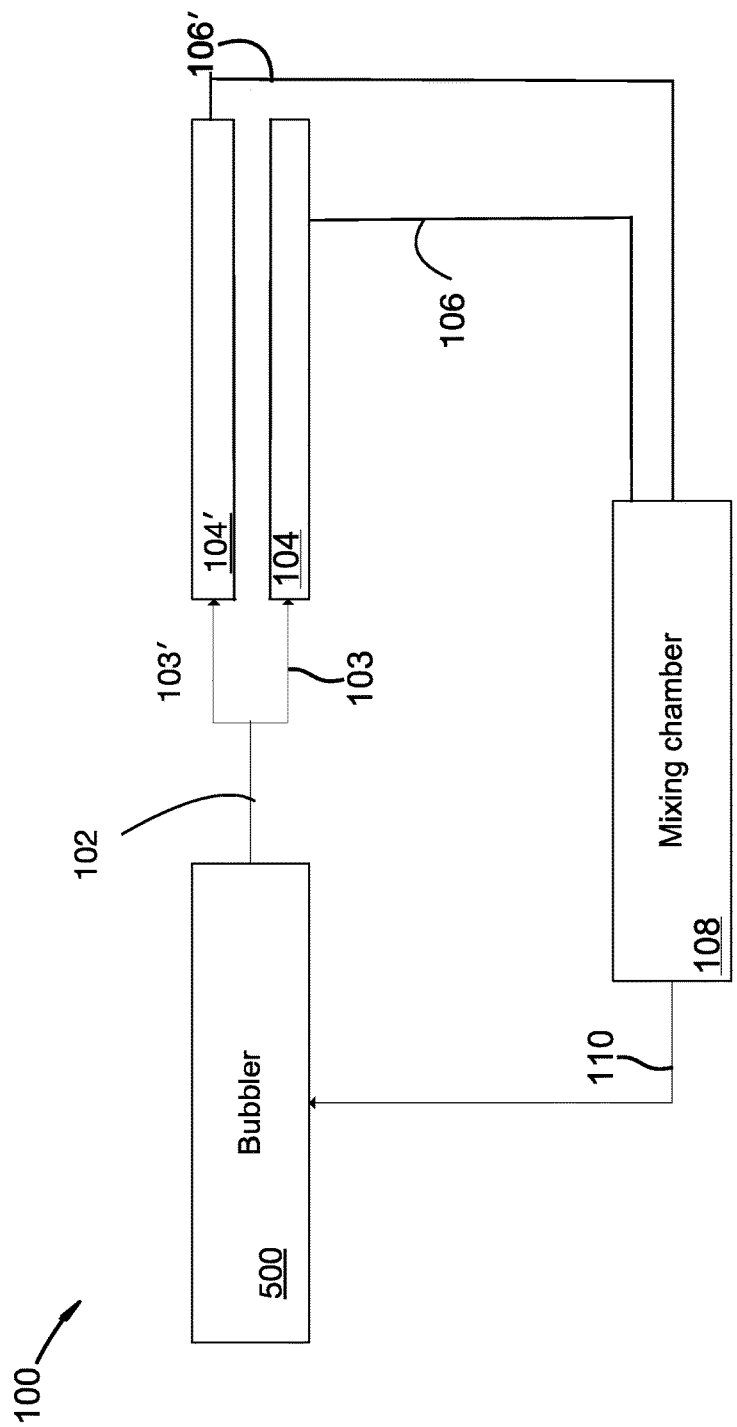
FIG. 1 is an illustration of a process for decreasing fouling in a process using a desublimating heat exchanger.

A method of decreasing fouling in a process using a desublimating heat exchanger is disclosed; the method, comprises: providing a desublimating heat exchanger having a main chamber, the main chamber having a number of stages; splitting or separating a liquid outlet stream, also referred to as a liquid outgoing stream, from the desublimating heat exchanger into a plurality of parallel liquid streams comprising a first parallel liquid stream and a second parallel liquid stream; sending the number of parallel liquid streams through other devices for performing a unit operation; changing the temperature of at least one of the parallel liquid streams, via the other device for performing a unit operation, creating a plurality of parallel liquid streams of differing temperature; providing a mixing chamber wherein the parallel liquid streams of differing temperature may be mixed; injecting a portion of the plurality of parallel liquid streams of differing temperature, which are at a lower temperature, into the mixing chamber; injecting a portion of the plurality of parallel liquid streams of differing temperature, which are at a higher temperature, into the mixing chamber at a lower point than the lower temperature parallel liquid streams which have been injected into the mixing chamber; allowing the injected parallel liquid streams to reach a uniform temperature; and allowing the injected parallel liquid streams to partially freeze or vaporize in the mixing tank.

In some disclosed methods, two parallel liquid streams may be used. The first parallel stream may be circulated through a screw press. The second parallel stream may be circulated through a heat exchanger. The exit stream may be saturated with carbon dioxide. The main housing of the mixing chamber may also be the main housing of the desublimating heat exchanger. The mixing chamber may be a tank placed downstream from the other device for performing a unit operation. The method may additionally comprise creating a mixed stream emerging from the mixing chamber at the uniform temperature; and recycling the mixed stream to the desublimating heat exchanger. An apparatus for decreasing fouling in a process using a desublimating heat exchanger is disclosed; the apparatus may comprise: a desublimating heat exchanger with a number of stages; an exit stream of liquid emerging from the desublimating heat exchanger; a plurality of parallel streams splitting from the exit stream; a number of device for performing a unit operation through which a number of the parallel streams may pass; a plurality of parallel streams of differing temperatures emerging from the device for performing a unit operation; a mixing chamber configured to contain liquids at differing temperatures; a number of injection points into the mixing chamber configured to inject the number of parallel streams at differing temperatures; and a mixed stream emerging from the mixing chamber at a uniform temperature. The apparatus as may have two parallel streams. The first parallel stream may pass through a screw press. The second parallel stream may pass through a heat exchanger. The exit stream may be saturated with carbon dioxide. The mixing chamber may be the desublimating heat exchanger. The mixing chamber may be a tank placed downstream from the device for performing a unit operation. The apparatus may additionally comprise a stirring mechanism in the mixing chamber configured to stir the contents of the mixing chamber. The apparatus may further comprise a recycling injection point, through which the mixed stream may be injected into the desublimating heat exchanger.

A method for decreasing fouling in a system using a desublimating heat exchanger is disclosed, the method may comprise: providing a desublimating heat exchanger with a number of stages; splitting a liquid outlet stream from the desublimating heat exchanger into two parallel liquid streams; sending the first parallel liquid stream through a screw press; sending a first screw press outlet stream through a separation unit; sending the second parallel liquid stream through a heat exchanger; changing the temperature of at least one of the parallel liquid streams, via the screw press, separation unit, or heat exchanger, creating a plurality of parallel liquid streams of differing temperature; providing a mixing chamber wherein the parallel liquid streams of differing temperature may be mixed; injecting a portion of the plurality of parallel liquid streams of differing temperature, which are at a lower temperature, into the mixing chamber; injecting a portion of the plurality of parallel liquid streams of differing temperature, which are at a higher temperature, into the mixing chamber at a lower point than the lower temperature parallel liquid streams which have been injected into the mixing chamber; allowing the injected parallel liquid streams to reach a substantially uniform temperature; allowing the injected parallel liquid streams to partially freeze or vaporize in the mixing tank; creating a mixed stream emerging from the mixing chamber at the uniform temperature; and injecting the mixed stream back into the desublimating heat exchanger. The method may include using a mixing chamber that also serves as the main chamber of the desublimating heat exchanger. The method may also include using a mixing chamber that also serves as a tank with one or more vertical dividers which separate the tank into two or more compartments; in some embodiments, the different compartments hold liquids, gases, or liquids and gases at different temperatures. configured to hold liquids at different temperatures, and comprises a stirring mechanism configured to mix the contents of the mixing chamber.

A method of decreasing fouling in a process using a desublimating heat exchanger is disclosed, the method comprising: providing a first desublimating heat exchanger comprising a main chamber; separating a liquid outgoing stream of the desublimating heat exchanger into at least two parallel liquid streams comprising a first parallel liquid stream and a second parallel liquid stream; processing the first parallel liquid stream via a first unit operation and processing the second parallel liquid stream via a second unit operation; providing a mixing chamber of a second desublimating heat exchanger, the mixing chamber may comprise a plurality of stages, the plurality of stages may comprise an upper stage and a lower stage positioned below the upper stage, the upper stage and the lower stage may be coupled by at least one downcomer; injecting the first parallel liquid stream into the mixing chamber at an opening of a first injection conduit positioned at the lower stage; injecting the second parallel liquid stream into the mixing chamber at an opening of a second injection conduit positioned at the upper stage; and, mixing the first parallel liquid stream with the second parallel liquid so that the first parallel liquid stream and the second parallel liquid stream have a substantially uniform temperature. In some embodiments injecting the first parallel liquid stream into the mixing chamber may occur at an opening of a first injection conduit positioned at a lower section of the mixing chamber. In some embodiments the lower section is a section of the mixing chamber closer to the ground than the upper section of the mixing chamber. Although in some embodiments the mixing chamber may include stages, in other embodiments the mixing chamber may not include stages but may be configured so that different layers or different levels of the mixing chamber may hold liquids or substances at different temperatures. The injecting of the second parallel liquid stream into the mixing chamber may occur at an opening of a second injection conduit positioned at an upper section of the mixing chamber.

In some methods, the first parallel liquid stream is injected, at the opening of the first injection conduit, into a liquid with a temperature that is substantially similar to the temperature of the first parallel liquid stream at the time of injection; the method of claim 1 further comprising the steps of: measuring, via a first temperature sensor, a first temperature of the first parallel liquid stream after the first parallel liquid stream has been processed via the first unit operation; sending data representing the first temperature to a temperature module; measuring, via a second temperature sensor, a second temperature of the second parallel liquid stream after the second parallel liquid stream has been processed by the second unit operation; sending data representing the second temperature to the temperature module; and, using the data representing the first temperature and the data representing the second temperature to determine, via the temperature module, that the first parallel liquid stream is warmer than the second parallel liquid stream. In some disclosed methods, the upper stage is the uppermost stage of the mixing chamber. In some disclosed methods, the step of injecting the first parallel liquid stream into the mixing chamber at the opening of the first injection conduit positioned at the lower stage, or at a lower section of the mixing chamber, further comprises injecting the first parallel liquid stream below the surface of a volume of liquid disposed inside the lower stage.

In some embodiments the upper stage is the uppermost stage of the mixing chamber, wherein the first parallel liquid stream comprises a) a liquid stream entrained with solids or b) a slurry stream, wherein the mixing chamber comprises a plurality of stages, the plurality of stages comprising an upper stage and a lower stage positioned below the upper stage, the upper stage and the lower stage being coupled by at least one downcomer; the lower section of the mixing chamber comprising a lower stage; the upper section of the mixing chamber comprising an upper stage.

In some embodiments the liquid outgoing stream is saturated with carbon dioxide, the method further comprising the step of vaporizing the mixed liquid stream in the desublimating heat exchanger or the step of partially freezing the mixed liquid stream, via the first desublimating heat exchanger, to precipitate carbon dioxide from the mixed liquid stream.

In some embodiments the first desublimating heat exchanger comprises a plurality of stages, the plurality of stages comprising an upper stage and a lower stage positioned below the upper stage, the upper stage and the lower stage being coupled by at least one downcomer.

In some embodiments the method further comprises the step of vaporizing the mixed liquid stream in the desublimating heat exchanger or the step of partially freezing the mixed liquid stream, via the first desublimating heat exchanger, to precipitate carbon dioxide from the mixed liquid stream.

In some disclosed methods, the first unit operation is a screw press and the second unit operation is a heat exchanger.

In some disclosed methods, the liquid outgoing stream is saturated with carbon dioxide.

In some disclosed methods, the method includes creating a mixed stream comprising a portion of the first parallel liquid stream and a portion of the second parallel liquid stream and recycling the mixed stream, via a conduit, to the main chamber of the desublimating heat exchanger.

A method of decreasing fouling in a process using a desublimating heat exchanger is disclosed, the method comprising: providing a first desublimating heat exchanger comprising a plurality of stages, the plurality of stages comprising an upper stage and a lower stage positioned below the upper stage, the upper stage and the lower stage being coupled by at least one downcomer; separating a liquid outgoing stream of the first desublimating heat exchanger into at least two parallel liquid streams comprising a first parallel liquid stream and a second parallel liquid stream; processing the first parallel liquid stream via a first unit operation and processing a second parallel liquid stream via a second unit operation; measuring a first temperature of the first parallel liquid stream after the first parallel liquid stream has been processed via the first unit operation and measuring a second temperature of the second parallel liquid stream after the second parallel liquid stream has been processed by the second unit operation; sending data representing the first temperature to a temperature module; measuring a second temperature of the second parallel liquid stream after the second parallel liquid stream has been processed by the second unit operation; sending data representing the second temperature to the temperature module; using the data representing the first temperature and the data representing the second temperature to determine, via the temperature module, that the first parallel liquid stream is warmer than the second parallel liquid; injecting the first parallel liquid stream that has been processed by the first unit operation into the lower stage of the first desublimating heat exchanger at an opening of a first injection conduit of the first desublimating heat exchanger; injecting the second parallel liquid stream that has been processed by the second unit operation into the upper stage of the first desublimating heat exchanger at an opening of a second injection conduit of the first desublimating heat exchanger; and, mixing, in the first desublimating heat exchanger, the first parallel liquid stream with the second parallel liquid so as to form a mixed liquid stream having a substantially uniform temperature. Mixing may include allowing the two or more parallel liquid streams to engage in mixable contact, such as having a parallel liquid stream disposed at a upper stage trick down through a conduit to a lower stage in which a different parallel liquid stream is disposed. Pumps may also be used.

Some methods further comprise the steps of partially freezing the mixed liquid stream, via the first desublimating heat exchanger, to precipitate carbon dioxide from the mixed liquid stream. Some methods further comprise the steps of vaporizing the mixed liquid stream in the desublimating heat exchanger. Some methods further comprise the step of recycling the mixed liquid stream from the first desublimating heat exchanger through a conduit to the exterior of the first desublimating heat exchanger and then back into a stage positioned at or substantially near the middle section of first desublimating heat exchanger. Some methods include the step of injecting the first parallel liquid stream that has been processed by the first unit operation into the lower stage of the desublimating heat exchanger at an opening of a first injection conduit of the desublimating heat exchanger further comprises injecting the first parallel liquid stream below the surface of a volume of liquid disposed inside the lower stage. In some methods, the first unit operation is a screw press and the second unit operation is a heat exchanger. In some methods, the liquid outgoing stream is saturated with carbon dioxide. A system for decreasing fouling in a process using a desublimating heat exchanger is disclosed, the system comprising: a first desublimating heat exchanger; an outlet stream conduit coupled to the first desublimating heat exchanger, the outlet stream conduit splitting into a plurality of parallel stream conduits each carrying one parallel stream of the plurality of parallel streams;

measuring a first temperature of the first parallel liquid stream after the first parallel liquid stream has been processed via the first unit operation and measuring a second temperature of the second parallel liquid stream after the second parallel liquid stream has been processed by the second unit operation; measuring a second temperature of the second parallel liquid stream after the second parallel liquid stream has been processed by the second unit operation; sending data representing the second temperature to the temperature module; using the data representing the first temperature and the data representing the second temperature to determine, via the temperature module, that the first parallel liquid stream is warmer than the second parallel liquid; a first device performing a unit operation on a first parallel stream of the plurality of parallel streams, the first device performing a unit operation raising the temperature of the first parallel stream; a first temperature sensor operably measuring the temperature of the first parallel stream where the first parallel stream exits the first device performing the unit operation, the first temperature sensor communicating data representing the first temperature to a temperature module; a second device performing a second unit operation on the second parallel stream of the plurality of parallel streams, the second device performing a second unit operation lowering the temperature of the second parallel stream; a second temperature sensor operably measuring the temperature of the second parallel stream where the second parallel stream exits the second device performing the unit operation, the second temperature sensor communicating data representing the second temperature to the temperature module, the temperature module using the data representing the first temperature and the data representing the second temperature to determine, via the temperature module, that the first parallel liquid stream is warmer than the second parallel liquid; a second desublimating heat exchanger comprising a plurality of stages, the plurality of stages comprising a lower stage and an upper stage; the upper stage coupled to the lower stage via a downcomer; a conduit coupling the first parallel stream exiting the first device to a first opening, disposed in the lower stage, of an injection conduit, the injection portion of the conduit injecting the first parallel stream into the lower stage; and, a conduit coupling the second parallel stream from the second device to a second opening, disposed in the lower stage, of an injection conduit, the injection portion of the conduit injecting the second parallel stream into the upper stage.

In some embodiments of the system, the device performing the first unit operation is a screw press receiving the first parallel stream. In some embodiments of the system, the screw press is operably coupled to a separation unit, the separation unit receiving the first parallel stream. In some embodiments of the system, the second parallel stream is operably coupled to a heat exchanger.

In some embodiments of the system at least one of the plurality of parallel stream exiting from the outlet stream is saturated with carbon dioxide.

In some embodiments the system includes a stirring mechanism in the mixing chamber configured to stir the contents of the mixing chamber, the stirring mechanism comprises a stirring rod operably coupled to a stirring assembly comprising a power source and a rotating gear system coupled to the stirring rod.

Reference to carbon dioxide are nonlimiting; condensable solids or vapors which may be separated from process streams include natural gases, NOx, SOx, Hg, $O_3$, impurities, contaminants, pollutants, odorous gases, and air toxins. Although this application is directed towards carbon dioxide, the disclosure herein may be used with other gas separation systems other than carbon dioxide gas separating systems.

DETAILED DESCRIPTION

A detailed description of the claimed invention is provided below by example, with reference to examples in the appended figures. Those of skill in the art will recognize that the components and steps of the invention as described by example in the figures below could be arranged and designed in a wide variety of different configurations without departing from the substance of the claimed invention. Thus, the detailed description of the examples in the figures is merely representative examples of the invention, and is not intended to limit the scope of the invention as claimed. In the present specification and in the appended, claims the term desublimating heat exchanger refers to a system for separating condensable vapors from light gases by desublimating the condensable vapors, comprising: a direct contact heat exchanger (DCHE) unit including a non-volatile heat exchange liquid (NVHEL) within a vessel, the vessel having a process stream inlet, a light gas outlet, and a desublimated solids outlet. In some embodiments, the desublimating heat exchanger also includes a process stream inlet configured to cause a condensable-vapor-containing process stream to directly contacts the NVHEL within the vessel, wherein the system is configured to cool the NVHEL to a temperature and pressure such that direct contact of the NVHEL with the process stream causes the condensable vapors to desublimate and form separated cool gases and a slurry comprising desublimated solids and the NVHEL, the separated light-gas stream exiting the DCHE vessel through the light gas outlet, the desublimated solids exiting the DCHE vessel through the desublimated solids outlet; and a solids separator that separates at least a portion of the desublimated solids from the NVHEL.

In the present specification and in the appended, the term device for performing a unit operation refers to a step in a process which involves a physical change or chemical transformation. For example, a unit operation may be a screw press, a heat exchanger, or a separation unit.

In the present specification and in the appended claims, the term stages refers to a series of plates and downcomers used to increase the efficiency of heat transfer, as in a desublimating heat exchanger. Plates may be arranged substantially horizontally within the desublimating heat exchanger; plates may be arranged substantially vertically within the desublimating heat exchanger.

The phrase "a number of" means one, two, or more of a certain item, object, or action. A number of canisters would mean a quantity of canisters equal to one, two, three, or any other counting number greater than 3.

For purposes of this disclosure, the modules refer to a combination of hardware and program instructions to perform a designated function. Each of the modules may include a processor and non-transitory storage memory. The program instructions are stored in the memory, and cause the processor to execute the designated function of the modules.

FIG. 1 is a schematic depiction of a system (100) for decreasing fouling in a process using a desublimating heat exchanger (500), also referred to as a bubbler. An outlet stream (102) from the desublimating heat exchanger (500) may be split into a plurality of parallel streams (103, 103'); the spitting of the outlet stream (102) may occur within the desublimating heat exchanger (500), at the edge of the desublimating heat exchanger (500), or outside of desublimating heat exchanger (500). The parallel streams (103, 103') may be sent through other device for performing a unit operation (104, 104'), and the device for performing a unit operation (104, 104') may change the temperature of at least one of the parallel streams (103, 103'). In some embodiments, the device for performing a unit operation may be 2, 3, 4, 5, or more device for performing a unit operation; the plurality of parallel streams may be 2, 3, 4, 5 or more parallel streams. Parallel streams of differing temperature (106) may emerge from the device for performing a unit operation (104). The parallel streams of differing temperature (106) may be sent to a mixing chamber (108). A mixed stream of uniform temperature (110) may emerge from the mixing chamber (108), and the mixed stream may be recycled back to the desublimating heat exchanger (500) so as to reintroduce the mixed steam into the desublimating heat exchanger (500).

FIG. 2A and FIG. 2B illustrate the fouling that may occur in a process using a desublimating heat exchanger without a mixing chamber; use of the methods and apparatuses described herein may eliminate or decrease fouling. FIG. 2A depicts a solid buildup (204) on the walls of a pipe (200) in a process using a desublimating heat exchanger. In some preferred embodiments, the buildup may be caused by carbon dioxide in a warm stream (202). The warm stream may mix with a cool stream, and the carbon dioxide may freeze out of the solution and accumulate on the walls of the pipe.

FIG. 2B depicts cavitation in a pipe. In some embodiments, mixing the warm stream (202) with the cool stream may cause some of the cool stream to vaporize (206). In some embodiments, a warm stream may be substantially warmer than a heavy stream which includes solid or liquid carbon dioxide; when the warm stream contacts the heavy stream, and cavitation (depicted at 206) may occur.

Figure 3:
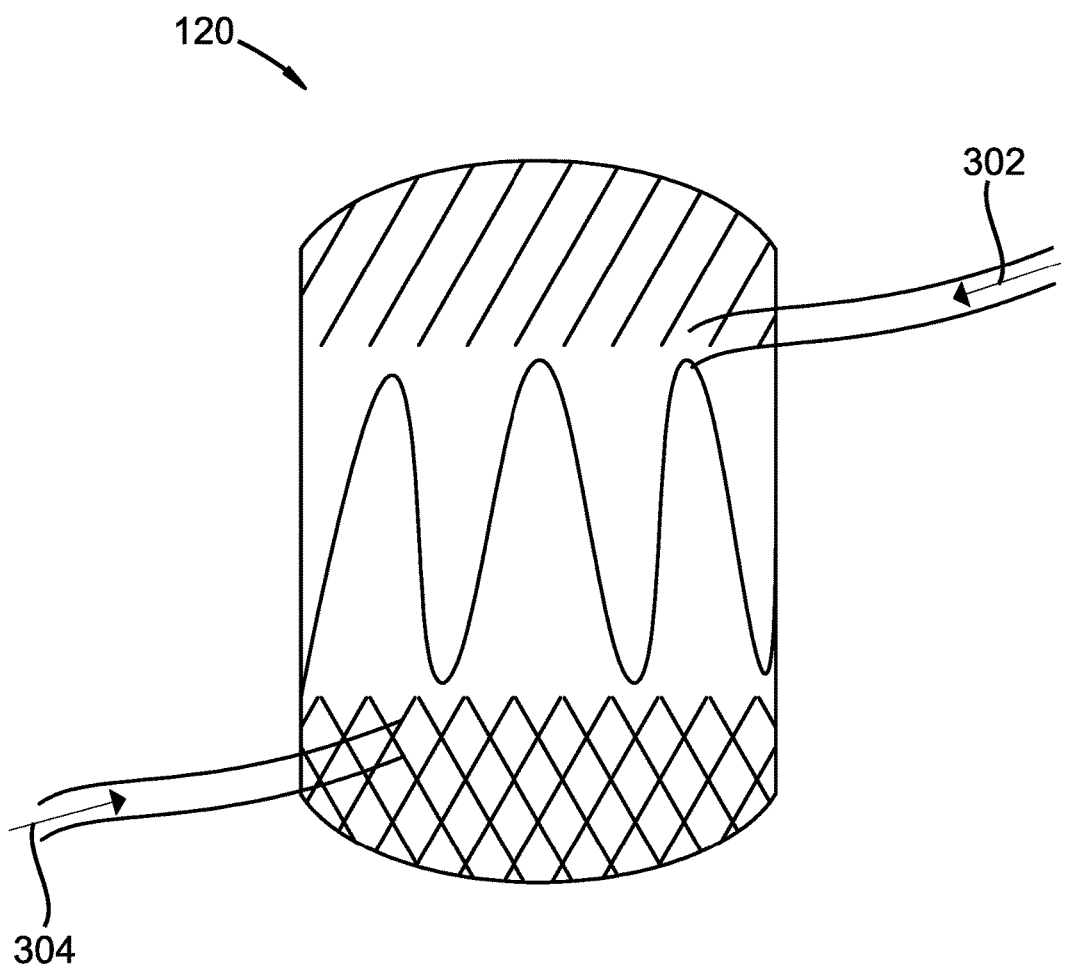
FIG. 3 is an illustration of a mixing chamber to be used in a process as in FIG. 1.

FIG. 3 is an illustration of a mixing chamber, such as the one depicted in FIG. 1. In some embodiments, the mixing chamber (300) may additionally comprise a stirring mechanism. Any references to stirring mechanisms in this disclosure includes a rod connected to a gear system in which the rod may rotate in a counterclockwise or clockwise direction. In some preferred embodiments, the injected liquids in the mixing chamber (300) may mix without a stirring mechanism due to differences in density. A warm stream (304) may be injected into the bottom of the mixing chamber (300), with a cool stream (302) injected into the top of the mixing chamber (300). A cool stream may be initially cooler in temperature than a warm stream. The warm stream (304) may have a lower density than the cool stream (302). Due to this difference in density, the liquid from the warm stream (304) may rise toward the top of the mixing chamber (300) while the liquid from the cool stream (302) may sink toward the bottom of the mixing chamber (300), thus causing mixing between the two liquid streams having two different temperatures. Although situations having two liquid streams are described, some embodiments include more than two streams, with the cooler streams being grouped together at the injection point or points into the bubbler and the warmer streams being grouped together at the injection point or points of the bubbler. As the cooler stream or cooler streams mix with the warmer stream or warmer streams mix, the two liquids, each which may differ in temperature from the other liquid of the two liquids, may exchange heat and reach a substantially uniform temperature.

Figure 4:
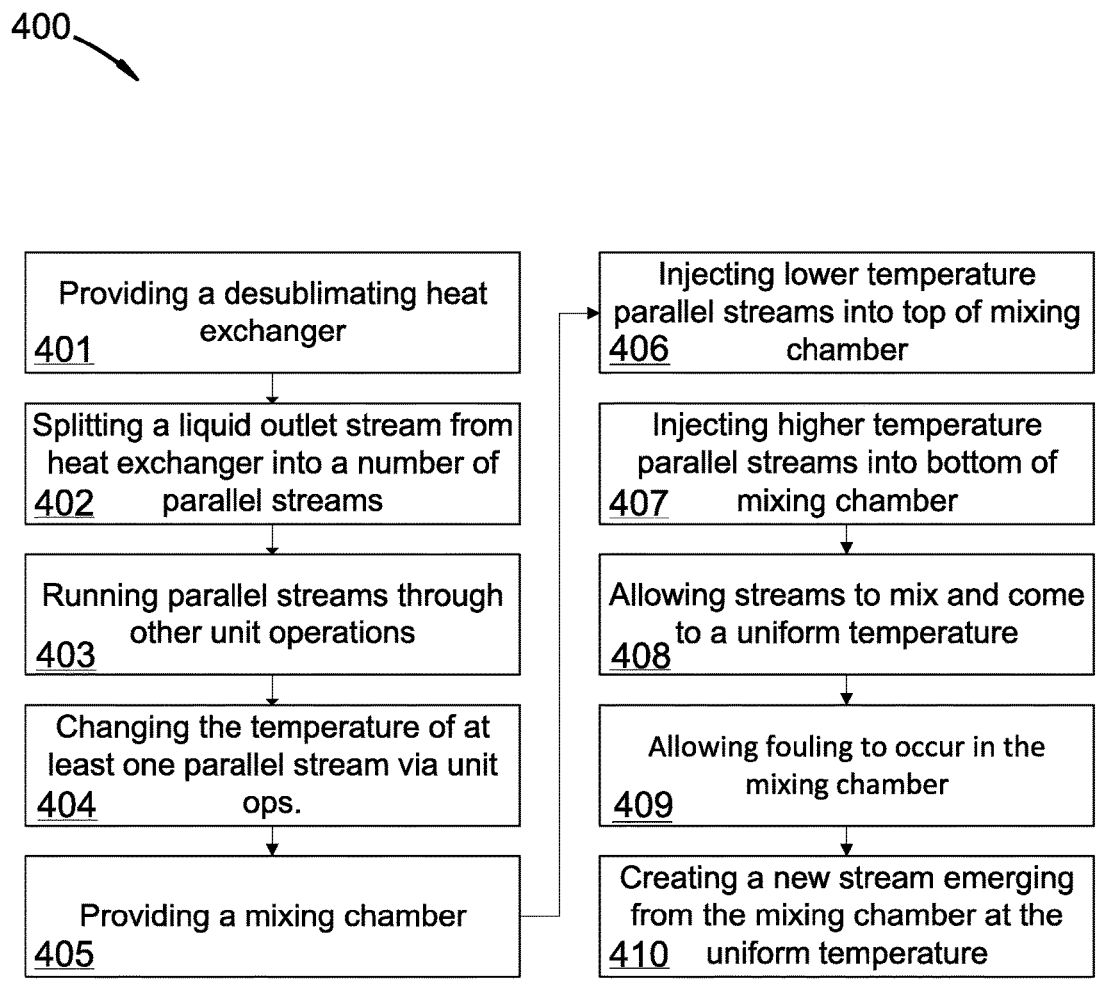
FIG. 4 is a diagram of a method for decreasing fouling in a process using a desublimating heat exchanger.

FIG. 4 is a method diagram for decreasing fouling in a process using a desublimating heat exchanger. In Step 401 a desublimating heat exchanger (500) may be provided. The heat exchanger may (500) have a number of stages. Step 402 may include splitting a liquid outlet stream (102) from the desublimating heat exchanger (500) into a plurality of parallel streams (103). The liquid outlet stream (102) may be saturated with a solute, such as carbon dioxide. At least one of the parallel streams (103) may contain the solute. In Step 403 the plurality of parallel streams (103) may be passed through a number of other device for performing a unit operation (104). In some embodiments, the device for performing a unit operation (104) may be a heat exchanger, a screw press, additional separation processes, or combinations thereof. Step 404 may include changing the temperature of at least one of the number of parallel liquid streams (103) via the device for performing a unit operation (104). Some device for performing a unit operation (104) may include a heating mechanism such as a heating element powered by electricity, natural gas or coal; others may include a heat exchanger to decrease the temperature of the number of parallel liquid streams (103). Step 405 may include providing a mixing chamber (300) wherein the parallel liquid streams of differing temperature (106) may be mixed. Step 406 may include injecting at least one lower temperature parallel stream into the top of the mixing chamber (300). Step 407 may include injecting at least one higher temperature parallel stream into the bottom of the mixing chamber (300). Step 408 may include allowing the injected streams to mix and come to a substantially uniform temperature in the mixing chamber (300). Mixing may occur simply due to density differences between the parallel liquid streams, as in FIG. 3, or the mixing chamber (300) may comprise a stirring mechanism to mix the different temperature liquids (106). Step 409 may include allowing the liquids in the mixing chamber (300) to reach a substantially uniform temperature, and containing any fouling that may occur to the mixing chamber (300). For example, in some embodiments, a solid may freeze out of the solution, such as by sublimating or precipitating. The solid may be the solute, such as carbon dioxide, mentioned in step 402. Step 410 may include creating a new stream (110) emerging from the mixing chamber (300) at the uniform temperature, which may be recycled back to the desublimating heat exchanger (500).

Figure 5:
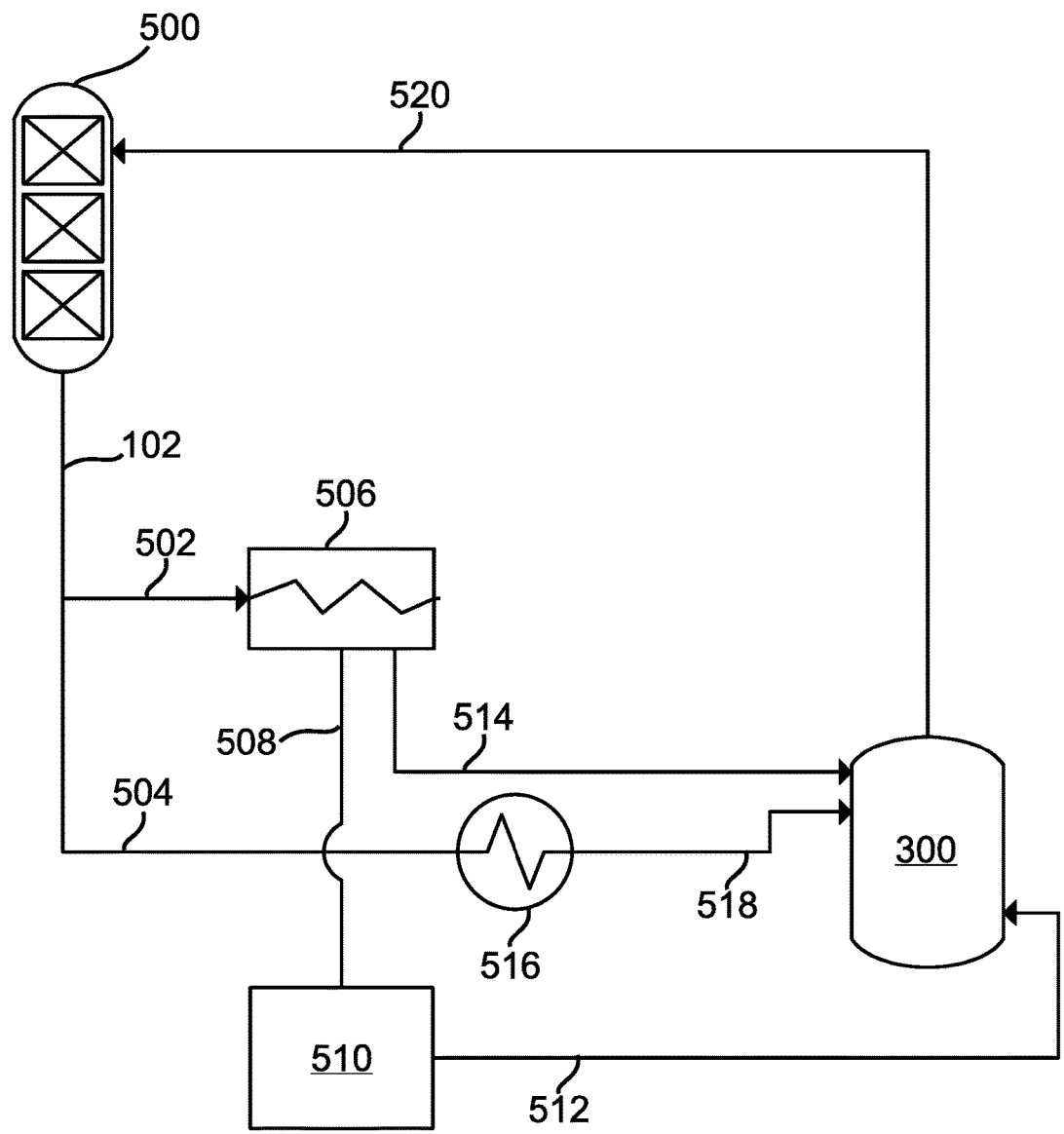
FIG. 5 is an illustration of an apparatus for decreasing fouling in a process using a desublimating heat exchanger, with a separate mixing chamber.

FIG. 5 depicts an embodiment of a system for decreasing fouling in a process using a desublimating heat exchanger (500), with a mixing chamber being disposed separately and outside of the desublimating heat exchanger (500). In some embodiments, the mixing chamber may be disposed in a desublimating heat exchanger separate from desublimating heat exchanger (500). The system may comprise a mixing chamber (300), and an exit stream (102) which may exit from the desublimating heat exchanger (500). The exit stream (102) may be saturated with a solute, such as carbon dioxide. In some preferred embodiments, the exit stream may be split into two parallel streams. The first parallel stream (502) may be sent through a screw press (506) and one or more outlet streams may emerge from the screw press (506). In FIG. 5, two outlet streams (508, 514) are depicted emerging from the screw press (506). The first outlet stream (508) may be sent through an additional separation process (510) before being sent to the mixing chamber (300), but in other embodiments, the first outlet stream (508) may be sent directly to the mixing chamber (300). The outlet stream from the separation process (512) may be sent to the mixing chamber (300). The second outlet stream (514) may be sent directly to the mixing chamber (300). The second parallel stream (504) may be sent through a heat exchanger (516) or other unit operation. The outlet stream (518) from the heat exchanger (516) may also be sent to the mixing chamber (300).

In some embodiments, the mixing chamber (300) may be located downstream of the device for performing a unit operation and upstream of the desublimating heat exchanger (500). The mixing chamber (300) may be a tank configured to hold liquids of differing temperatures. In some embodiments, the mixing chamber (300) may comprise a stirring mechanism. In some preferred embodiments, the outlet stream from the separation process (512) may be at a higher temperature than the outlet stream from the heat exchanger (518) and the second outlet stream from the screw press (514). In other embodiments, the outlet stream with the highest temperature or the lowest temperature is an outlet stream other than the outlet stream from the separation process.

The outlet stream (518) from the heat exchanger and the second outlet stream (514) may be injected into the mixing chamber (300). The outlet stream from the separation process (512), which may be at a higher temperature than the other outlet streams, may be injected into the mixing chamber (300) at an injection point that is vertically lower compared to the injection point or injection points for the outlet stream (518) from the heat exchanger and the second outlet stream (514) from the screw press. The outlet stream (512) from the separation process may be injected into the mixing chamber (300) simultaneously or substantially simultaneously as the outlet stream from the heat exchanger (518) and the second outlet stream from the screw press (514), when the outlet stream from the separation process (512) is injected at a lower point than the other two streams. A lower injection point may be closer to the ground than the upper injection point. The injected streams may be allowed to mix in the mixing chamber (300) and may reach a substantially uniform temperature. Once the injected streams are mixed, they may exit the mixing chamber (300) as a mixed stream (520) at the uniform temperature. The mixed stream (520) may then return to the desublimating heat exchanger (500) and recycle through the process.

Figure 6:
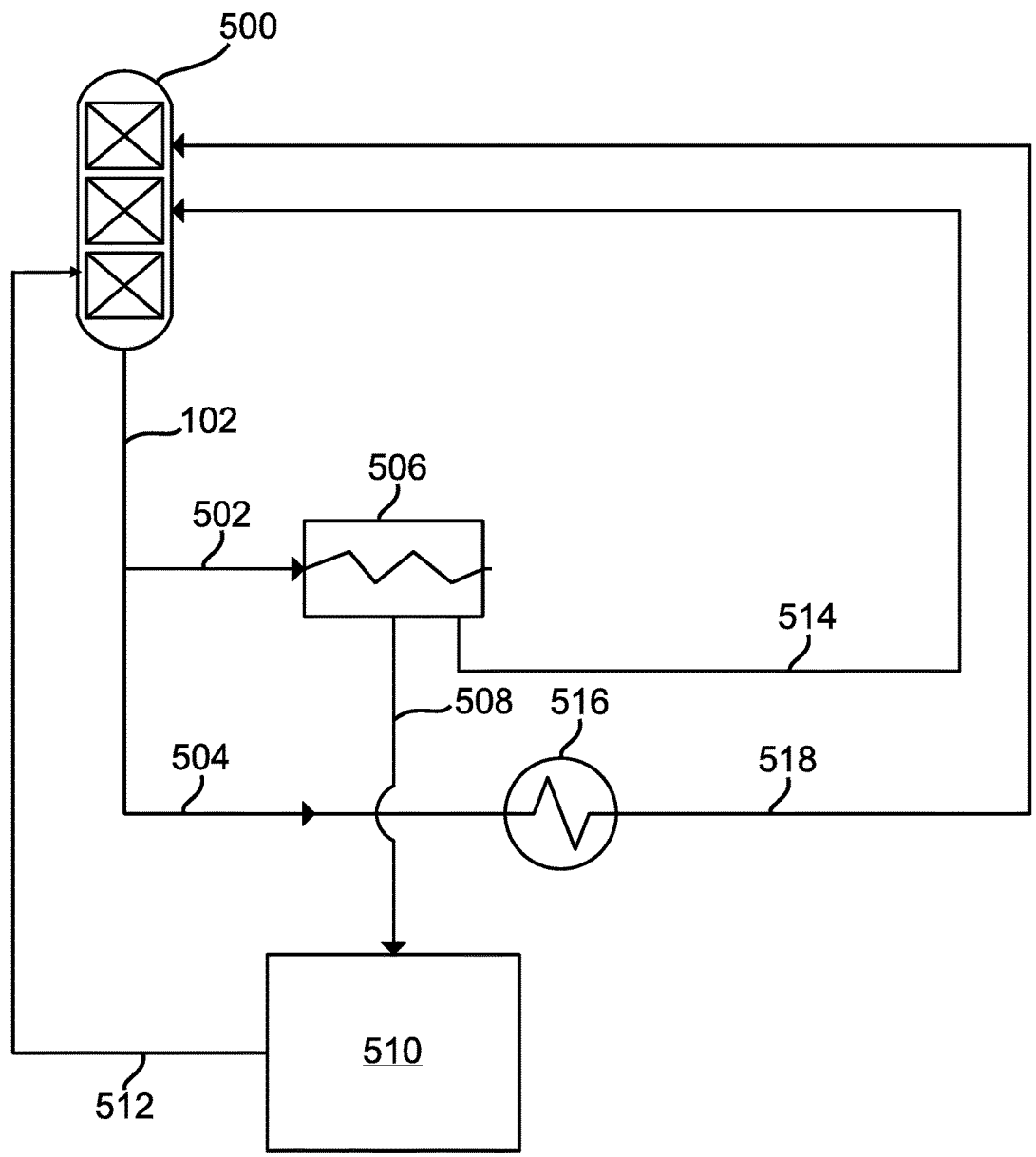
FIG. 6 is an illustration of the apparatus as in FIG. 5, wherein the mixing chamber is the desublimating heat exchanger.

Referring to FIG. 6, in some embodiments, the mixing chamber may refer to the main housing tank of the desublimating heat exchanger. FIG. 6 is an illustration of an apparatus similar to that of FIG. 5, wherein the separate mixing chamber (300) is removed and the parallel streams of differing temperature are recycled directly back to the desublimating heat exchanger (500) so that the desublimating heat exchanger (500) may also function as the mixing chamber (300) of FIG. 5. In some preferred embodiments, the outlet stream from the separation unit (512) may be at a higher temperature than the outlet stream (518) from the heat exchanger and the second outlet stream (514) from the screw press. In these embodiments, the outlet stream from the separation unit (512) may be injected nearer to the bottom of the mixing chamber of the desublimating heat exchanger (500) than the injection point or points of the other outlet streams. (Parallel streams, parallel liquid streams, outlet streams, and parallel liquid streams may be used interchangeably for the purpose of this disclosure). In some embodiments, the outlet stream from the separation unit (512) may be returned to the warmer stage of the desublimating heat exchanger (500). In some embodiments, when the outlet stream (518) from the heat exchanger and the second outlet stream (514) from the screw press are at a relatively lower temperature compared to the temperature of the outlet stream (512) of the separation unit, then outlet stream (518) and the second outlet stream (514) may be injected into the desublimating heat exchanger (500) near the top of the mixing chamber of the desublimating heat exchanger, or at least above the injection point of the outlet stream (512) of the separation unit. In some embodiments, the second outlet stream from the screw press (514) may be injected into the desublimating heat exchanger (500) under the liquid level in the lower stage. In the preferred embodiments, the desublimating heat exchanger may have a plurality of stages; the stages may be separated by horizontal plates. An injection point at a relatively higher point than an injection point at a relatively lower point may occur at an upper or uppermost stage. An injection point at a relatively lower point may occur at a lower stage or bottom stage.

Figure 7:
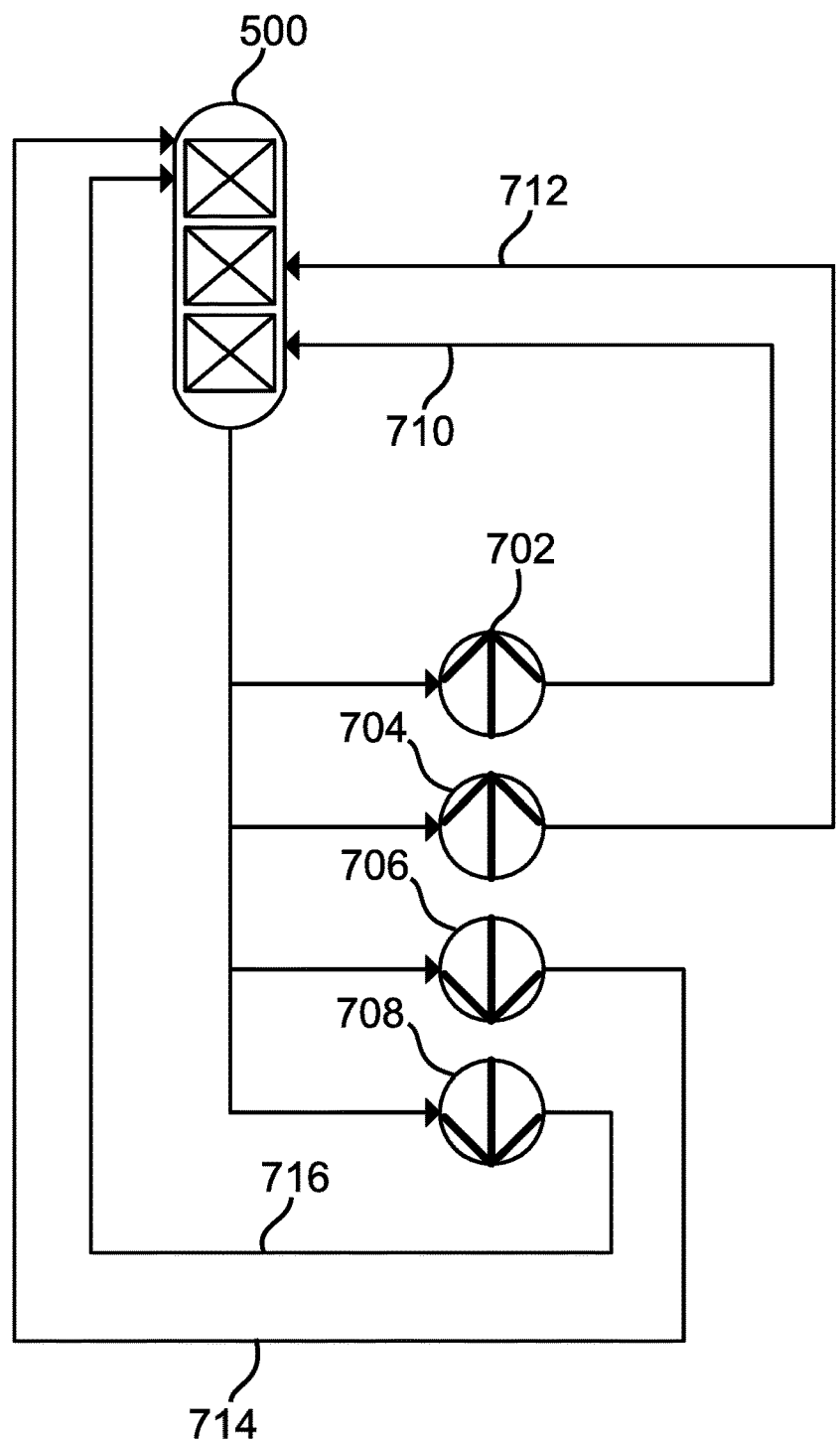
FIG. 7 is an illustration of a basic method for decreasing fouling in a process using a desublimating heat exchanger wherein the mixing chamber is the desublimating heat exchanger.

FIG. 7 is an illustration of a method for decreasing fouling in a process using a desublimating heat exchanger, wherein the main housing of the mixing chamber is also the main housing of the desublimating heat exchanger (500); the main housing may be separated into stages by horizontal plates. An exit stream (102) from the desublimating heat exchanger (500) may be split into two or more parallel streams. In some preferred embodiments the exit stream (102) may be split into four parallel streams. Splitting of an exit stream may be accomplished by channeling an exit stream through a conduit which branches off into two or more conduits, which may be substantially parallel in the alignment of a first conduit of the two more conduits with respect to a second conduit of the two or more conduits. A first and second parallel stream may be circulated through a first and second unit operation (702, 704), respectively, which may increase the temperature of the first and second streams. A third and fourth parallel stream may be circulated through a third and fourth unit operation (706, 708), respectively, which may decrease the temperature of the third and fourth streams. The warmer streams (710, 712) may be injected directly back into the desublimating heat exchanger (500), and the cooler streams (714, 716) may be injected directly back into the desublimating heat exchanger (500) at an injection point which is vertically higher than the injection point of the warmer streams (710, 712). In some embodiments, the coolest stream is injected at the highest-vertical stage of the desublimating heat exchanger (500).

Figure 8A:
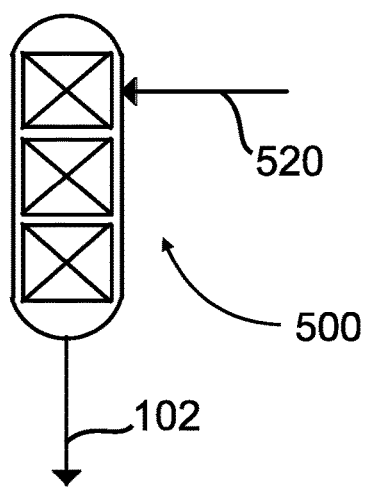
FIG. 8A is an illustration of the desublimating heat exchanger as in FIG. 5, showing inlet and outlet streams.

FIG. 8A is an illustration of the inlet and outlet streams for an embodiment of the desublimating heat exchanger (500) shown in FIG. 5. The outlet stream (102) may exit the desublimating heat exchanger (500) and may then be split into parallel streams. 'Splitting into parallel streams' may include channeling a stream into a conduit which branches, such as described in the description for FIG. 7. In some embodiments, there may be only one inlet stream to the desublimating heat exchanger (500). This inlet stream may be the mixed stream (520) emerging from the mixing chamber (300).

Figure 8B:
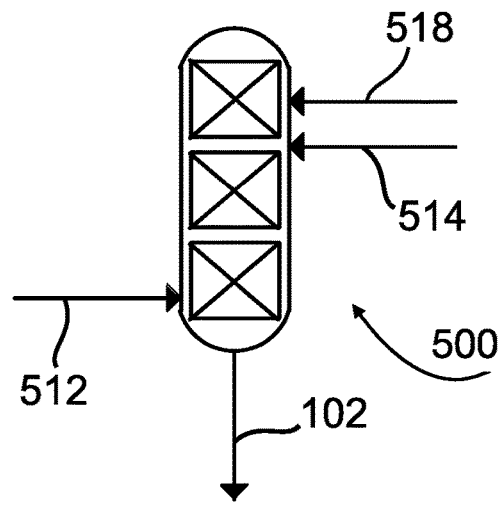
FIG. 8B is an illustration of the desublimating heat exchanger as in FIG. 6, showing inlet and outlet streams.

FIG. 8B is an illustration of the inlet and outlet streams for an embodiment of the desublimating heat exchanger as shown in FIG. 6. The outlet stream (102) may leave the desublimating heat exchanger (500) and may then be split into parallel streams. In some embodiments, there may be three or more inlet streams to the desublimating heat exchanger. The outlet stream from the heat exchanger (518) and the second outlet stream from the screw press (514) may be injected near the top of the desublimating heat exchanger (500), and may be injected along with any lower temperature streams. The outlet stream from the separation unit (512) may be injected near the bottom of the desublimating heat exchanger (500) and may be injected along with any other higher temperature streams.

Figure 9:
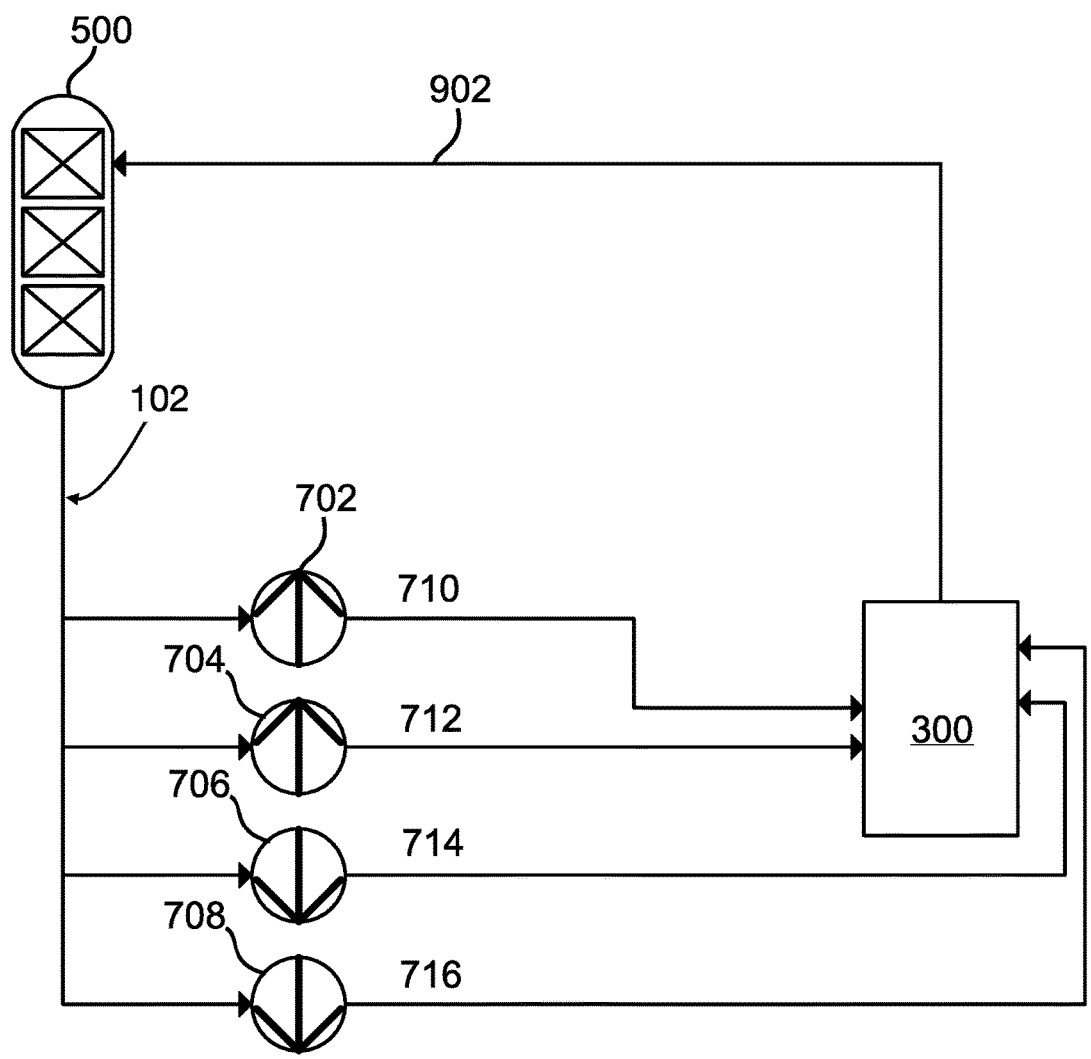
FIG. 9 is an illustration of a basic method for decreasing fouling in a process using a desublimating heat exchanger with an external mixing chamber.

FIG. 9 is an illustration of a basic method for decreasing fouling in a process using a desublimating heat exchanger with an external mixing chamber. An exit stream (102) emerging from the desublimating heat exchanger (500) may be split into a plurality of parallel streams. In some embodiments, the splitting into a plurality of parallel streams may occur at the wall of the desublimating heat exchanger (500) or may occur within the desublimating heat exchanger (500). A first stream may be sent through a first unit operation (702), and a second stream may be sent through a second unit operation (704). The first unit operation (702) and the second unit operation (704) may increase the temperature of the first stream and the second stream. Likewise, a third stream and fourth stream may be circulated through a third (706) and fourth unit operation (708), which may decrease the temperature of the third stream and fourth stream. The warmer streams (710, 712) may then be injected into the mixing chamber (300) with the cooler streams (714, 716). The cooler streams (714, 716) may be injected at a higher point or higher stage than the injection point of the warmer streams (710, 712) or the stage at which the warmer streams (710, 712) are injected. After the injected streams are allowed to mix and reach a uniform temperature, they may emerge from the mixing chamber (300) as a mixed stream (902) at the uniform temperature. The mixing step may occur transporting one or more of the cooler streams (714, 716) to the same stage at which the warmer streams (710, 712) are located; or in other embodiments, one or more cooler streams are allowed to trickle down through downcomers until they contact the warmer stream or warmer streams. The mixed stream (902) may then be recycled back to the desublimating heat exchanger (500).

Figure 10:
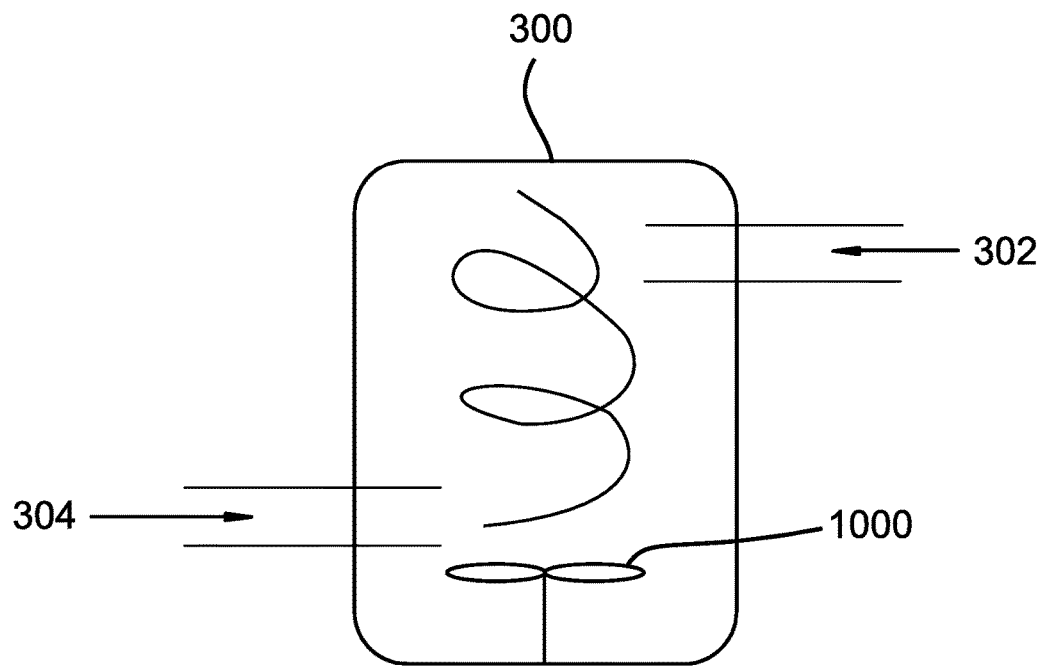
FIG. 10 is an illustration of a mixing chamber with a stirring mechanism to be used in a process as in FIG. 1.

FIG. 10 is a depiction of a mixing chamber (300) similar to the one in FIG. 3. In some embodiments, the mixing chamber (300) may comprise a stirring mechanism (1000). The stirring mechanism may be configured to mix the contents of the mixing chamber (300).

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

The invention claimed is:

1. A method of decreasing fouling in a process using a desublimating heat exchanger, comprising:
   providing a first desublimating heat exchanger comprising a main chamber;
   separating a liquid outgoing stream of the desublimating heat exchanger into at least two parallel liquid streams comprising a first parallel liquid stream and a second parallel liquid stream;
   processing the first parallel liquid stream via a first unit operation and processing the second parallel liquid stream via a second unit operation;
   providing a mixing chamber of a second desublimating heat exchanger;
   injecting the first parallel liquid stream into the mixing chamber at an opening of a first injection conduit positioned at a lower section of the mixing chamber;
   injecting the second parallel liquid stream into the mixing chamber at an opening of a second injection conduit positioned at an upper section of the mixing chamber; and,
   mixing the first parallel liquid stream with the second parallel liquid so that the first parallel liquid stream and the second parallel liquid stream have a substantially uniform temperature.

2. The method of claim 1 wherein the upper stage is the uppermost stage of the mixing chamber, wherein the first parallel liquid stream comprises a) a liquid stream entrained with solids or b) a slurry stream, wherein the mixing chamber comprises a plurality of stages, the plurality of stages comprising an upper stage and a lower stage positioned below the upper stage, the upper stage and the lower stage being coupled by at least one downcomer; the lower section of the mixing chamber comprising a lower stage; the upper section of the mixing chamber comprising an upper stage.

3. The method of claim 1 wherein the step of injecting the first parallel liquid stream into the mixing chamber at the opening of the first injection conduit positioned at the lower stage further comprises injecting the first parallel liquid stream below the surface of a volume of liquid disposed inside the lower stage.

4. The method of claim 1 wherein the first unit operation is a screw press and the second unit operation is a heat exchanger.

5. The method of claim 1 wherein the liquid outgoing stream is saturated with carbon dioxide, the method further comprising the step of vaporizing the mixed liquid stream in the desublimating heat exchanger or the step of partially freezing the mixed liquid stream, via the first desublimating heat exchanger, to precipitate carbon dioxide from the mixed liquid stream.

6. The method of claim 1 additionally comprising creating a mixed stream comprising a portion of the first parallel liquid stream and a portion of the second parallel liquid stream and recycling the mixed stream, via a conduit, to the main chamber of the first desublimating heat exchanger.

7. A system for decreasing fouling in a process using a desublimating heat exchanger, comprising:
   a first desublimating heat exchanger;
   an outlet stream conduit coupled to the first desublimating heat exchanger, the outlet stream conduit splitting into a plurality of parallel stream conduits each carrying one parallel stream of the plurality of parallel streams;
   measuring a first temperature of a first parallel liquid stream of the plurality of parallel streams after the first parallel liquid stream has been processed via a first unit operation and measuring a second temperature of a second parallel liquid stream of the plurality of parallel streams after the second parallel liquid stream has been processed by a second unit operation;
   measuring a second temperature of the second parallel liquid stream after the second parallel liquid stream has been processed by the second unit operation;
   sending data representing the second temperature to the temperature module;
   using the data representing the first temperature and the data representing the second temperature to determine, via the temperature module, that the first parallel liquid stream is warmer than the second parallel liquid;
   a first device performing a unit operation on a first parallel stream of the plurality of parallel streams, the first device performing a unit operation raising the temperature of the first parallel stream;
   a first temperature sensor operably measuring the temperature of the first parallel stream where the first parallel stream exits the first device performing the unit operation, the first temperature sensor communicating data representing the first temperature to a temperature module;
   a second device performing a second unit operation on the second parallel stream of the plurality of parallel streams, the second device performing a second unit operation lowering the temperature of the second parallel stream;
   a second temperature sensor operably measuring the temperature of the second parallel stream where the second parallel stream exits the second device performing the unit operation, the second temperature sensor communicating data representing the second temperature to the temperature module, the temperature module using the data representing the first temperature and the data representing the second temperature to determine, via the temperature module, that the first parallel liquid stream is warmer than the second parallel liquid;
   a second desublimating heat exchanger comprising a plurality of stages, the plurality of stages comprising a lower stage and an upper stage; the upper stage coupled to the lower stage via a downcomer;
   a conduit coupling the first parallel stream exiting the first device to a first opening, disposed in the lower stage, of an injection conduit, the injection portion of the conduit injecting the first parallel stream into the lower stage; and,
   a conduit coupling the second parallel stream from the second device to a second opening, disposed in the lower stage, of an injection conduit, the injection portion of the conduit injecting the second parallel stream into the upper stage.

8. The system of claim 7, wherein the device performing the first unit operation is a screw press receiving the first parallel stream.

9. The system of claim 7, wherein the screw press is operably coupled to a separation unit, the separation unit receiving the first parallel stream.

10. The system of claim 7, wherein the second parallel stream is operably coupled to a heat exchanger.

11. The system of claim 7, wherein at least one of the plurality of parallel stream exiting from the outlet stream is saturated with carbon dioxide.

12. The system of claim 7, additionally comprising a stirring mechanism in the mixing chamber configured to stir the contents of the mixing chamber, the stirring mechanism comprises a stirring rod operably coupled to a stirring assembly comprising a power source and a rotating gear system coupled to the stirring rod.

* * * * *